United States Patent [19]
Gal et al.

[11] Patent Number: 6,065,005
[45] Date of Patent: May 16, 2000

[54] DATA SORTING

[75] Inventors: Shmuel Gal, Haifa; Dafna Sheinwald, Nofit, both of Israel; John M. Marberg, Sunnyvale, Calif.; Alan Hartmann, Prahran, Australia; Mila Keren; Zvi Yehudai, both of Nesher, Israel

[73] Assignee: International Business Machines Corporation, Armonk, N.Y.

[21] Appl. No.: 08/992,027

[22] Filed: Dec. 17, 1997

[51] Int. Cl.[7] .................................................. G05F 17/30
[52] U.S. Cl. .................. 707/7; 707/1; 707/2; 395/800.36
[58] Field of Search ................. 707/1, 2, 7; 395/800.23, 395/800.24, 800.34, 800.36

[56] References Cited

U.S. PATENT DOCUMENTS

| | | | |
|---|---|---|---|
| 4,575,798 | 3/1986 | Lindstrom et al. | 364/300 |
| 5,146,590 | 9/1992 | Lorie et al. | 395/600 |
| 5,396,622 | 3/1995 | Lee et al. | 395/600 |
| 5,579,515 | 11/1996 | Hintz et al. | 395/607 |
| 5,724,600 | 3/1998 | Ogiq | 395/800 |
| 5,822,748 | 10/1998 | Cohen et al. | 707/2 |
| 5,826,262 | 10/1998 | Bui et al. | 707/7 |

OTHER PUBLICATIONS

Suehiro et al. "Integer Sorting on Shared–Memory Vector Parallel Computers" ICS 98, ACM Website, pp. 313–320, Jul. 1998.

Dusseau et al. "Fast Parallel Sorting Under LogP: Experience with the CM–5" IEEE Transactions on Parallel and Distributed Systems, vol. 7, No. 8, pp. 791–805, Aug. 1996.

Mueck et al. "Optimizing Sort Order Query Execution in Balanced and Nested Grid Files" IEEE Transactions on Knowledge and Data Engineering, vol. 7, No. 2, pp. 246–260, Apr. 1995.

*Primary Examiner*—Paul V. Kulik
*Assistant Examiner*—Michael J. Wallace, Jr.
*Attorney, Agent, or Firm*—Noreen A. Krall; Esther E. Klein

[57] ABSTRACT

A method is described for operating a data processing system having a plurality of processors to sort a set of data records each having an associated key for governing the sort process. The method comprises determining a range for the key values by sampling the key values. The range is divided into a plurality of quantiles, one for each processor, each quantile having a respective index. At each processor, a plurality of buckets are defined, each bucket corresponding to a respective one of a plurality $M_p$ of subintervals in the quantile, each subinterval having a respective index. The index of the quantile in which the key value lies and the index of the subinterval in which the key value lies are determined directly from the key values using fast operations. Each key is distributed to the processor corresponding to the quantile in which the key value lies. At each processor, the keys falling in the quantile corresponding to the processor are distributed into the buckets according to the indices of the subintervals in which the key values lie, the buckets being processed in sequence in order to sort the records and the keys in each bucket sorted if the bucket contains more than one key. Finally, the sorted keys from each processor are concatenated.

7 Claims, 4 Drawing Sheets

DATA SORTING

BACKGROUND OF THE INVENTION

1. Field of the Invention

The invention relates to data sorting in computers and, more particularly, to a method and apparatus for data sorting in multiprocessors using sorting by intervals.

2. Background Description

The sorting of data is a very important and often used function in data processing systems. In such systems data is generally stored in files composed of records and the sorting process is governed by the value of one of the fields of the records, called the key. It is estimated that of the order of 20% of all computer running time is spent sorting. Improvement of the efficiency and speed of sorting methods in computers is therefore of substantial technical importance.

There are a large number of known sorting procedures. A general review of many of the known methods can be found in Knuth 'The Art of Computer Programming—Sorting and Searching', vol 3, (1973).

European patent application number EP 0 699 994 describes a recently developed sorting method which uses a statistical sampling approach to estimate the minimal range which contains all or almost all of the data. Using this technique which will be referred to in the following as 'sorting by intervals', sorting proceeds by dividing the overall range into many small sub-intervals and computing for each data item, using a fast operation, its subinterval. This technique has been theoretically shown to be linear in the number of elements to be sorted with a small coefficient. The development of this technique provided a significant improvement over previously existing sorting methods which required an expected sorting time of the order of $N\log_2 N$.

SUMMARY OF THE INVENTION

It is an object of the present invention to provide a sorting method which uses the principles of sorting by intervals but which is adapted for efficient use on multiprocessors.

In brief, this and other objects are achieved by a method as set out in the appended claims for operating a data processing system having a plurality of processors to sort a set of data records each having an associated key for governing the sort process. The method comprises determining a range for the key values by sampling the key values. The range is divided into a plurality of quantiles, one for each processor, each quantile having a respective index. At each processor, a plurality of buckets are defined, each bucket corresponding to a respective one of a plurality $M_p$ of subintervals in the quantile, each subinterval having a respective index. The index of the quantile in which the key value lies and the index of the subinterval in which the key value lies are determined directly from the key values using fast operations. Each key is distributed to the processor corresponding to the quantile in which the key value lies. At each processor, the keys falling in the quantile corresponding to the processor are distributed into the buckets according to the indices of the subintervals in which the key values lie, the buckets being processed in sequence in order to sort the records and the keys in each bucket sorted if the bucket contains more than one key. Finally, the sorted keys from each processor are concatenated.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
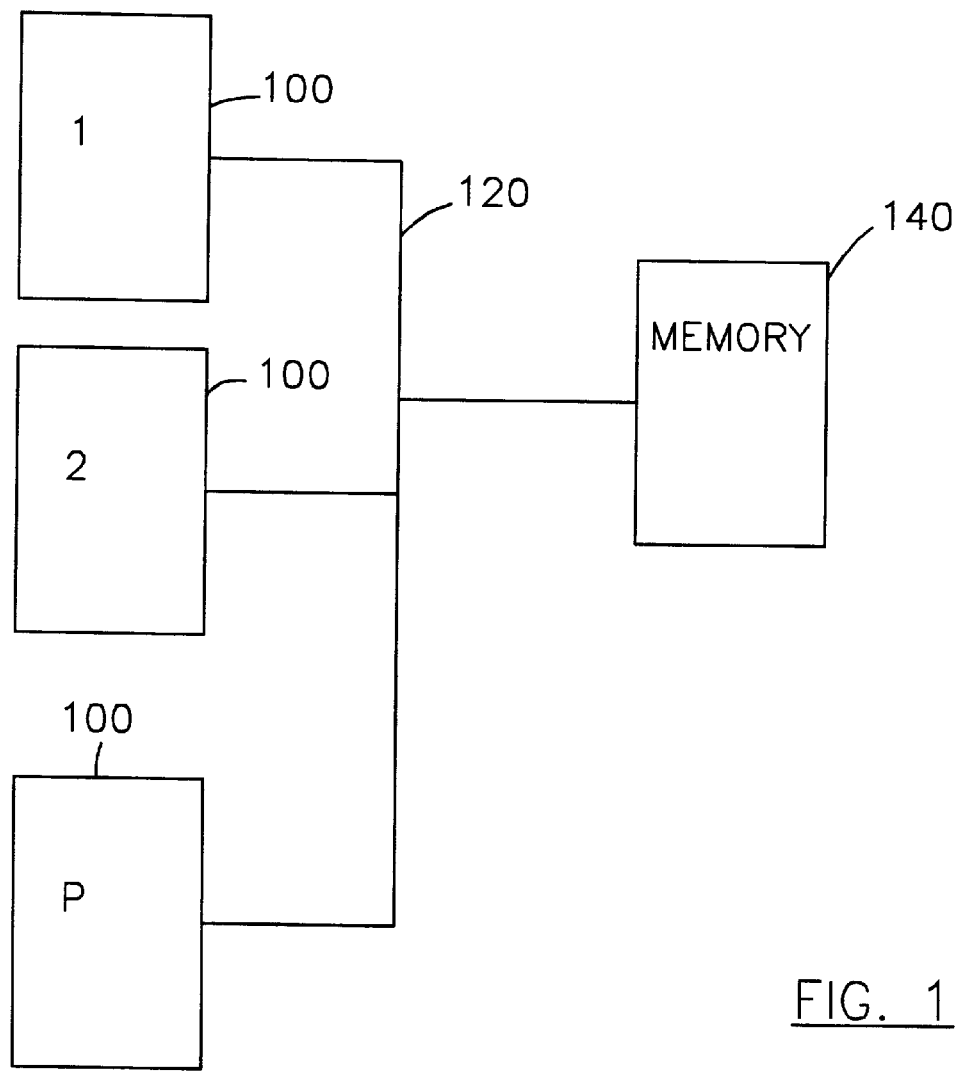
FIG. 1 is a schematic diagram showing a multiprocessor.

FIG. 1 is a schematic diagram illustrating a multiprocessor for which the sorting method according to the invention is suitable. The multiprocessor comprises a plurality of processors 100 interconnected by a bus structure 120. Each processor has access to a shared memory 140. It will be understood that there exist many different types of parallel or multiprocessors for which the present invention could be implemented. FIG. 1 is merely intended to illustrate the generic features of such systems which are useful for an understanding of the invention.

The basic sorting method, which will be referred to in the following as 'parallel sorting by intervals' consists of two phases which are respectively illustrated in the flow diagrams of FIG. 2 and FIGS. 3 and 4. An overview of these two phases will first be presented and then each will be described in more detail.

1. Sort preprocessing

Figure 2:
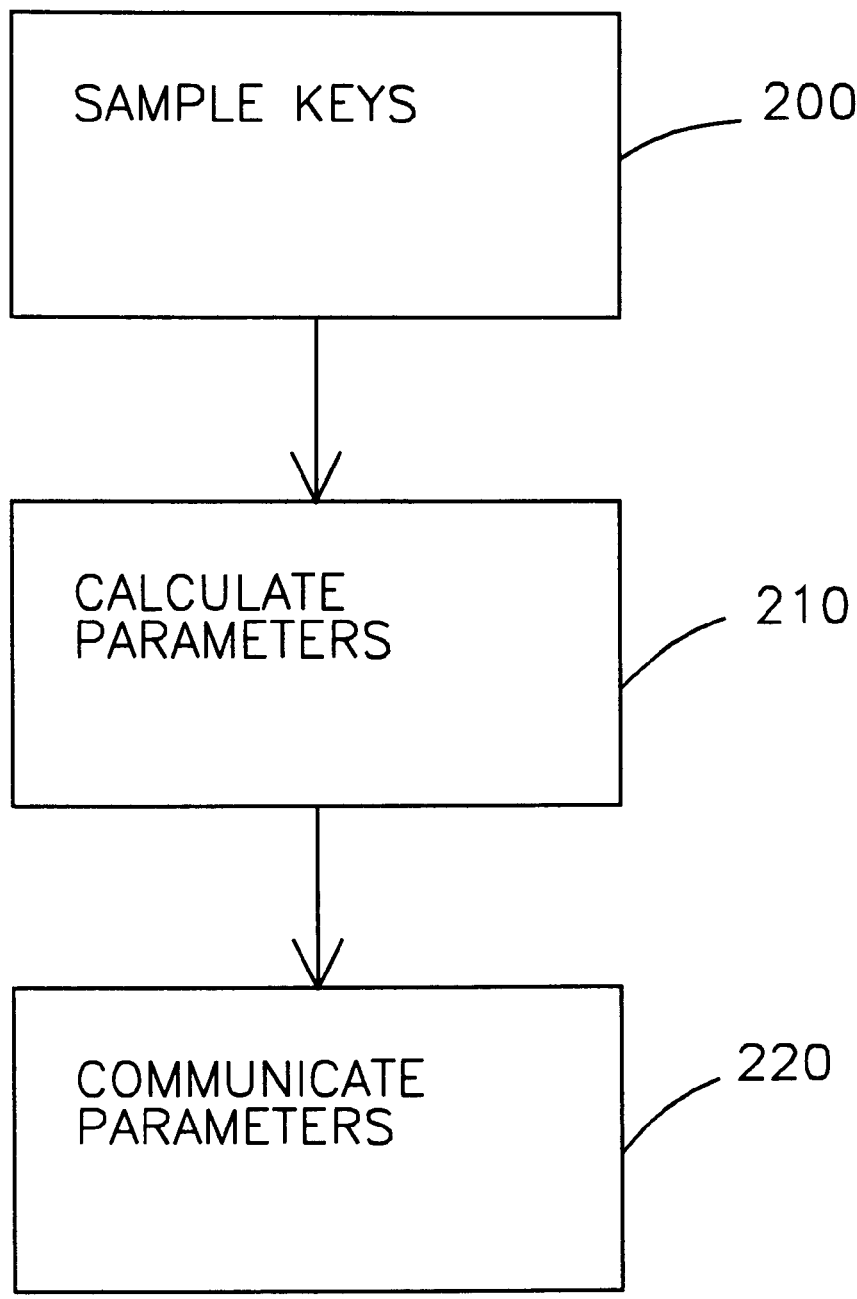
FIG. 2 is a flow diagram showing the sort preprocessing phase.

The sort preprocessing phase is carried out by one of the processors 100 and is illustrated in FIG. 2. In this phase a sample is taken in step 200 from the file to be sorted in order to estimate the range of key values in the file. The range is divided into P quantiles, where P is the number of processors. Each quantile is divided into subintervals which serve as buckets for the sorting process. Parameters are set up in step 210 to allow fast computation of the quantile and the sub-interval to which each element belongs. These parameters are communicated to each processor in step 220.

2. Sorting

Figure 3:
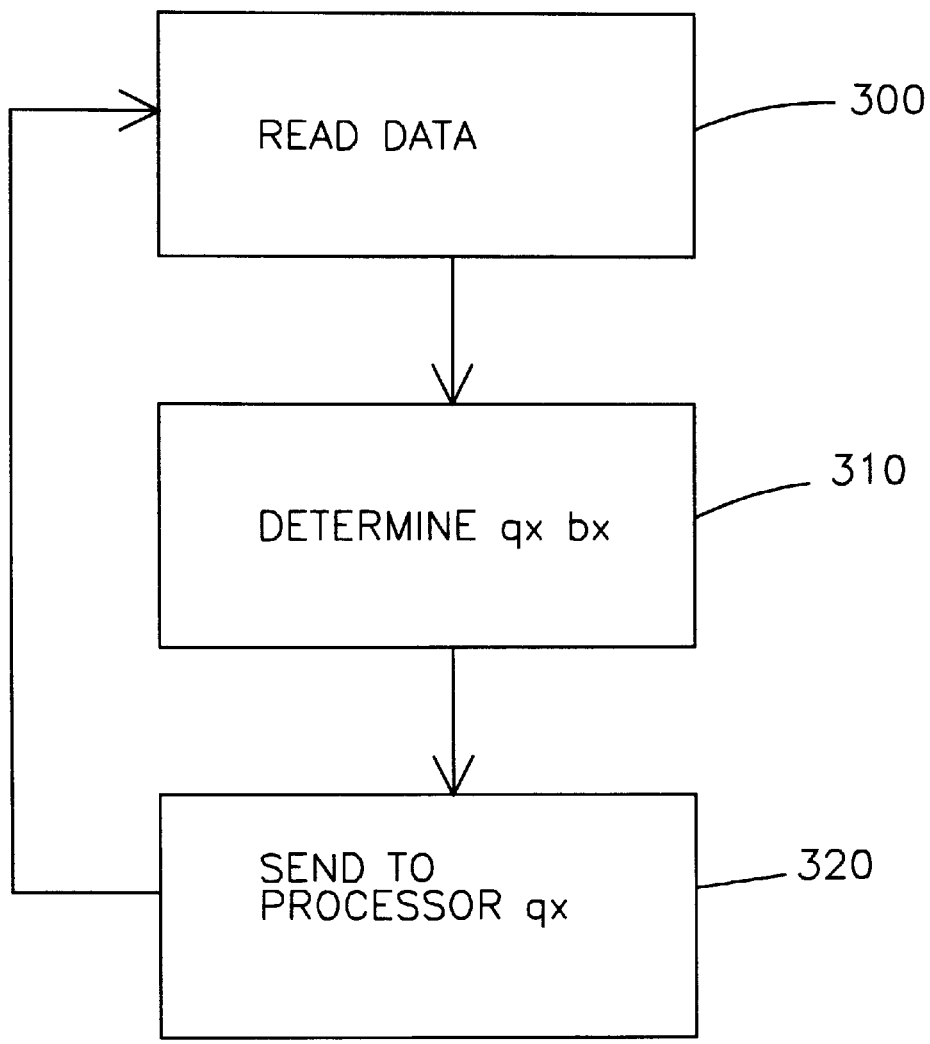
FIGS. 3 and 4 are flow diagrams showing the sorting phase.
Figure 4:
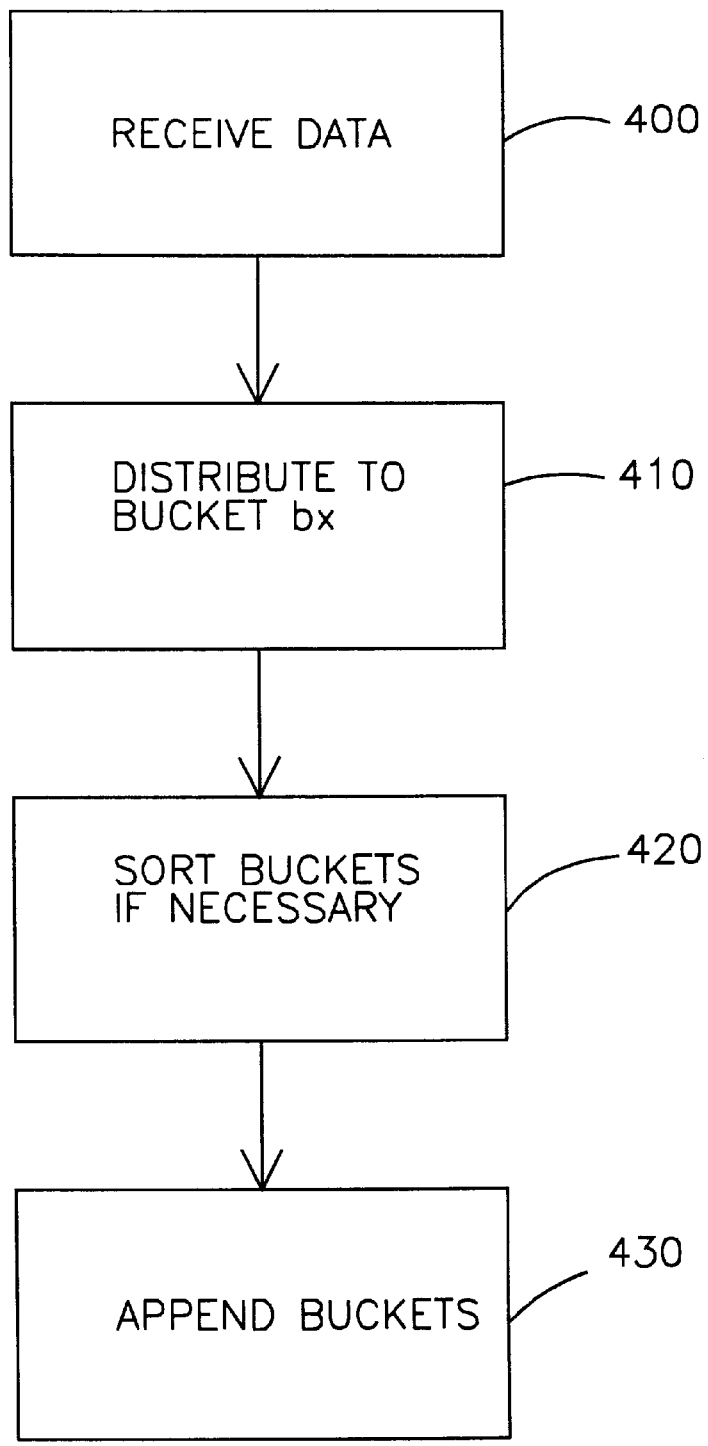

The sorting phase is carried out in each processor 100 and is illustrated in FIGS. 3 and 4. Each processor reads in step 300 a chunk of the initial data, computes the quantile and sub-interval to which each element belongs in step 310 and sends the elements to the corresponding target processors in step 320. Each quantile is then sorted locally using sorting by intervals as illustrated in FIG. 4. The distributed data is received in step 400 and distributed to bucket $b_x$ in step 410. Buckets containing more than one key are sorted in step 420 and the buckets appended together in step 430. The global sorted sequence is a concatenation of the sorted quantiles.

These stages are described in more detail below:

1. The Sort Preprocessing Phase

The file to be sorted is stored in memory 140 and comprises N records each of which has an associated key. The key values are denoted $x_1, x_2, \ldots x_N$. In this embodiment the key values $x_i$ are 32 bit binary numbers. Of course, each key also comprises a suitable pointer or the like identifying its associated record.

The preprocessing phase consists of the following three steps:

1. A random sample of n keys is taken from the file. The elements of the sample will be noted $y_1, y_2, \ldots y_n$. In the preferred embodiment n is chosen to be of the order of the square root of N for small N, but is kept constant at approximately 100 for larger N. In the preferred embodiment, $$n = Pw - 1$$

where $$w = CEIL\left(\frac{MIN(\sqrt{N}, 100)}{P}\right)$$

The random sampling can be achieved, for example, by taking a predetermined set of n indices, for example from a pseudo-random table, and picking the corresponding elements. For example, it is possible to use a fixed sequence of numbers $k_1, k_2, \ldots k_n$, which are randomly sampled in (−50, 50). Then index (j) can be determined from the relation:

$$\text{index}(j) = 50 + j \times IDEL + k_j$$

where IDEL is defined as the smallest integer less than or equal to N/n.

2. The maximum and minimum of the sample are calculated and a range (A,B) is determined as follows:

$$A = \text{maxy} - (\text{maxy} - \text{miny})\left(\frac{n+1}{n-3}\right)$$

$$B = \text{miny} + (\text{maxy} - \text{miny})\left(\frac{n+1}{n-3}\right)$$

This corresponds to a 3 sigma confidence interval for A and B in the case of a uniform distribution. As described in EP 0 699 994, the last L bits of A are set to zero in order to ensure, as explained below, that all keys in any one bucket share a common prefix of 32−L bits.

3. The overall range is divided into P quantiles. A table is then defined to be used during the sorting for computing the quantile of each data element.

From the sorted sequence of sample values $y_1 \ldots y_n$, a subset is chosen $y_2, y_{2w} \ldots y_{(p-1)w}$. This divides the range into P quantiles. It can be shown that with high probability the data is evenly distributed among the quantiles.

In the following F(x,A,s) represents the computation which results in the s most significant bits of x−A. Let s represent whichever is the largest of the number of bits required to represent P plus 3 or 6, ie $$s = MAX \{CEIL (\log_2 P) + 3, 6\}.$$

A table T[i], $0 \leq i \leq (2^s - 1)$ is defined as follows:

T[i]=1 for all $0 \leq i \leq F(y_w, A, s)$;

T[i]=P for all $i > F(y_{(p-1)w}, A, s)$;

T[i]=p where 1<p<P, for all $F(y_{(p-1)w}, A, s) \leq i \leq F(y_{pw}, A, s)$.

The table T then forms a fast means of determining the quantile of an element x using the s most significant bits of x−A. Should this prove to be too coarse for a sub-range of the data, a two level table can be defined for that sub-range, taking into consideration additional bits.

The preferred method for calculating the values of T is as follows. First $2^s$ buckets are allocated. Each sample y is placed into bucket F(y,A,s). A counter is initialized to 1. A prefix sum computation is performed of the total number of elements in each bucket and those preceding it, starting with bucket 1 and onwards iteratively. Let k be the value of the counter before the iteration for the bucket i. Compute the prefix sum for i. If the sum exceeds wk, increment the counter (ie set it to k+1). Set T[i] to the value of the counter. It will be observed that there is no need to explicitly sort the sample or identify the sample values $y_w, \ldots, y_{(p-1)w}$.

4. The number of subintervals in each quantile is calculated as follows. First an integer L is determined as shown below, then the number of subintervals in each quantile Mp is calculated from L as follows, $$L = INT\left\{\log_2\left(\frac{B-A}{\alpha N}\right)\right\}$$

$$m_p = INT((A_{p+1} - A_p)2^{-L})$$

where, $i_p$ is the smallest index such that $T[i_p] = p$, $$A_p = (i_p 2^{d-s}),$$

$A_{p+1} = (B - A)$ and d is the number of bits required to represent B−A.

The total number of subintervals is $$M = \sum_p M_p = (B - A)2^{-L}$$

With these definitions M satisfies:

$$\alpha N \leq M < 2\alpha N,$$

In the above equations $\alpha$ is a parameter which can be tuned. It is usually selected in the range 1–3. It is described in EP 699994 how the optimum $\alpha$ may be selected. One efficient method for obtaining L is to shift B−A right by one place until the result is less than $2\alpha N$. L is the number of places shifted.

It is possible to choose a different value of L for each processor, so that all processors will have approximately the same number of buckets. In this case, $$L_p = INT\left(\log_2\left(\frac{(A_{p+1} - A_p)P}{\alpha N}\right)\right),$$

and $$M_p = (A_{p+1} - A_p)2^{-L_p}$$

5. The values A, B, L, s, d and the lists $A_p$, $M_p$ and the table T are sent to all processors.

2. The Sorting Phase

In the sorting phase the input data is read, a quantile and bucket is computed for each element, and the elements are sent to the corresponding processors. Each quantile is then sorted locally. The concatenation of the quantiles constitutes a sorted run.

In the following description the following notation will be used. Each data element has two indexes: a quantile or processor index $q_x$, and a bucket index $b_x$. Each processor p uses $M_p$ buckets, numbered 0 to $M_{p-1}$, and P−1 buffers numbered 1, ..., p−1, p+1, ..., P.

Each processor p performs the following steps.

1. The data is partitioned among the processors such that the elements in processor p precede the elements in processor P+1 in the sorted sequence.

A chunk of data is read. For each input element x, $q_x$ and $b_x$ are computed as follows:

If $x \leq A$, then $q_x=1$, $b=0$.

If $x>B$ then $q_x=P$, $b_x=M_{p-1}$.

Otherwise, $$q_x = \text{T}[F(x,A,s)], b_x = \text{INT}((x-A-A_{q_x})2^{-L}).$$

If $q_x=p$, x is moved into bucket $b_x$, otherwise x and $b_x$ are moved into buffer $q_x$.

When a buffer is filled it is sent to the corresponding processor and another empty buffer allocated.

It will be understood that $q_x$ and $b_x$ can be rapidly computed using shift operations similar to those described in EP 0 699 994 and that the communication overhead may be reduced by computing the bucket index $b_x$ at the target processor instead of sending it along with x.

2. Upon receiving a buffer from another processor, each element x of the buffer is moved to bucket $b_x$.

3. After having handled all the input data and received all the data from the other processors, each bucket which contains more than one element is sorted using any suitable sorting method, which may be either a conventional sorting method, such as QuickSort or sorting by intervals.

The concatenation of the buckets at each processor constitutes a sorted quantile. The concatenation of the sorted quantiles at each processor constitutes a sorted run.

As described above, the present implementation takes the form of a computer program and can be distributed in the form of a program product comprising a computer usable medium, such as a magnetic or optical disk, in which suitable program code is embodied for causing a computer to perform the sorting functions described above. Such a product could be a stand-alone sorting product or could equally form part of a library which includes other functions or be integrated into an application program such as a database manager.

While the invention has been described in terms of a preferred embodiment, those skilled in the art will recognize that the invention can be practiced with modification within the spirit and scope of the appended claims.

Having thus described our invention, what we claim as new and desire to secure by Letters Patent is as follows:

1. A method for operating a data processing system having a plurality of processors to sort a set of data records each having an associated key for governing the sort process, the method comprising:

determining a range for the key values by sampling the key values;

dividing the range into a plurality of quantiles, one for each processor, each quantile having a respective index;

at each processor, defining a plurality of buckets, each bucket corresponding to a respective one of a plurality $M_p$ of subintervals in the quantile, each subinterval having a respective index;

determining directly from each key value using fast operations the index of the quantile in which the key value lies and the index of the subinterval in which the key value lies;

distributing each key to the processor corresponding to the quantile in which the key value lies;

at each processor distributing the keys falling in the quantile corresponding to the processor into the buckets according to the indices of the subintervals in which the key values lie and processing the buckets in sequence in order to sort the records, sorting the keys in each bucket if the bucket contains more than one key; and concatenating the sorted keys from each processor.

2. A method as claimed in claim 1 wherein the size and spacing of the subintervals are selected so that the probability of more than one key value falling into a subinterval is low, whereby after the distribution most of the buckets will contain either zero or one element.

3. A method as claimed in claim 1 wherein the subintervals are equal.

4. A method as claimed in claim 1 wherein the quantiles are selected so that an equal number of the sampled key values fall into each quantile.

5. A method as claimed in claim 1, wherein the step of determining the index of the subinterval into which any key falls from the key value is carried out using a bit shift operation.

6. A data processing system having a plurality of processors, arranged to sort a set of data records each having an associated key for governing the sort process, the system comprising:

means for determining a range for the key values by sampling the key values;

means for dividing the range into a plurality of quantiles, one for each processor, each quantile having a respective index;

means at each processor, for defining a plurality of buckets, each bucket corresponding to a respective one of a plurality $M_p$ of subintervals in the quantile, each subinterval having a respective index;

means for determining directly from each key value using fast operations the index of the quantile in which the key value lies and the index of the subinterval in which the key value lies;

means for distributing each key to the processor corresponding to the quantile in which the key value lies;

means at each processor for distributing the keys falling in the quantile corresponding to the processor into the buckets according to the indices of the subintervals in which the key values lie and processing the buckets in sequence in order to sort the records, sorting the keys in each bucket if the bucket contains more than one key; and means for concatenating the sorted keys from each processor.

7. A program product comprising a computer usable medium in which suitable program code is embodied for causing a data processing system to perform a method comprising the steps of:

determining a range for the key values by sampling the key values;

dividing the range into a plurality of quantiles, one for each processor, each quantile having a respective index;

at each processor, defining a plurality of buckets, each bucket corresponding to a respective one of a plurality $M_p$ of subintervals in the quantile, each subinterval having a respective index;

determining directly from each key value using fast operations the index of the quantile in which the key value lies and the index of the subinterval in which the key value lies;

distributing each key to the processor corresponding to the quantile in which the key value lies;

at each processor distributing the keys falling in the quantile corresponding to the processor into the buckets according to the indices of the subintervals in which the key values lie and processing the buckets in sequence in order to sort the records, sorting the keys in each bucket if the bucket contains more than one key; and concatenating the sorted keys from each processor.

* * * * *